United States Patent [19]

Haga et al.

[11] 4,014,102

[45] Mar. 29, 1977

[54] METHOD OF AND AN APPARATUS FOR MEASURING THE ELECTRODE LENGTH IN AN ELECTRIC FURNACE

[75] Inventors: Hideo Haga, Tokyo; Mitosi Kosugi, Ichikawa; Yoshiyuki Kimura, Funabashi; Masakazu Takabatake, Ichikawa, all of Japan

[73] Assignee: Japan Metals and Chemicals Co., Ltd., Tokyo, Japan

[22] Filed: Aug. 21, 1975

[21] Appl. No.: 606,452

[52] U.S. Cl. .............................................. 33/126.6
[51] Int. Cl.² ........................................ G01B 5/18
[58] Field of Search ............... 33/126, 126.5, 126.6; 340/247

[56] References Cited

UNITED STATES PATENTS

| | | | |
|---|---|---|---|
| 2,139,899 | 12/1938 | Le Bus | 33/126.5 |
| 2,480,490 | 8/1949 | Mark | 33/126.5 |
| 2,557,488 | 6/1951 | White | 33/126.5 X |
| 2,657,577 | 11/1953 | Falk | 33/126.5 X |
| 2,754,596 | 7/1956 | O'Brien | 33/126.6 |
| 2,992,486 | 7/1961 | Ruth | 33/126.5 |
| 3,126,742 | 3/1964 | Jarboe et al. | 33/126 X |
| 3,474,539 | 10/1969 | Moore | 33/126 |

*Primary Examiner*—Charles E. Phillips
*Attorney, Agent, or Firm*—Stevens, Davis, Miller & Mosher

[57] ABSTRACT

The electrode length in an electric furnace is measured by arranging a wire conductor to depend right above a hollow electrode such that it can be lowered and raised through the hollow electrode. When the wire conductor is lowered through the hollow electrode and brought into contact with the molten process material within the electric furnace, an electric circuit constituted by the wire conductor, the process material and a power supply is closed so as to determine the electrode length extending below an electrode holder from a certain relation between the distance of descent of the wire conductor as indicated by a measuring means in accordance with current caused in the electric circuit upon closure thereof and a previously measured distance between the initial position of the end of the wire conductor before the descent thereof and the position of the electric holder.

17 Claims, 5 Drawing Figures

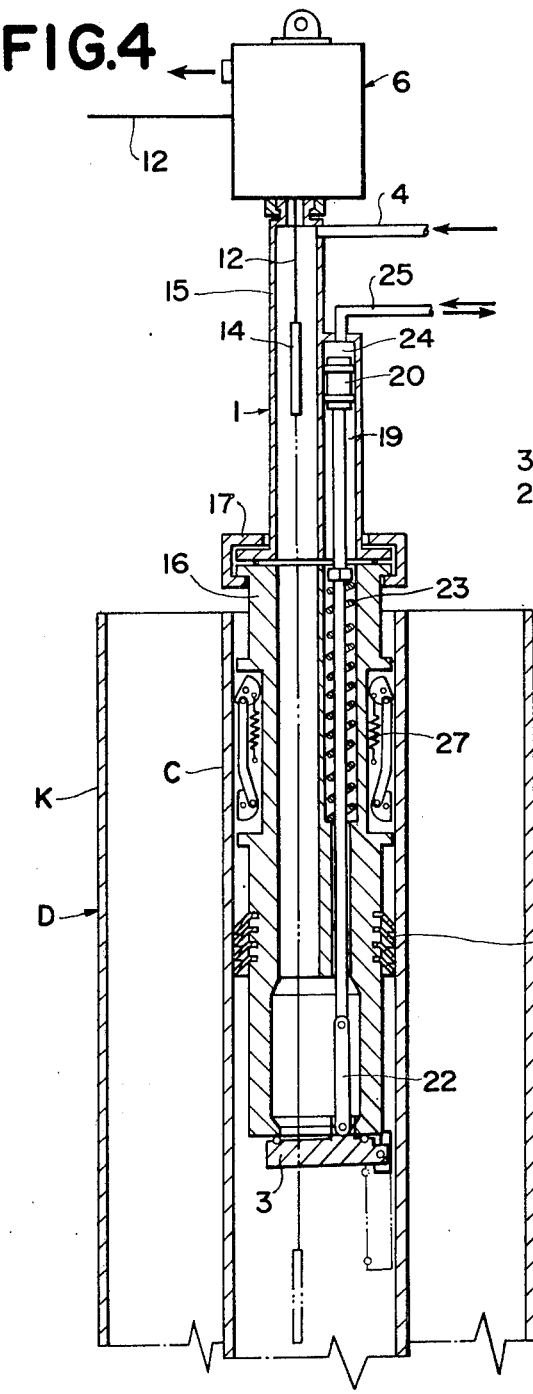
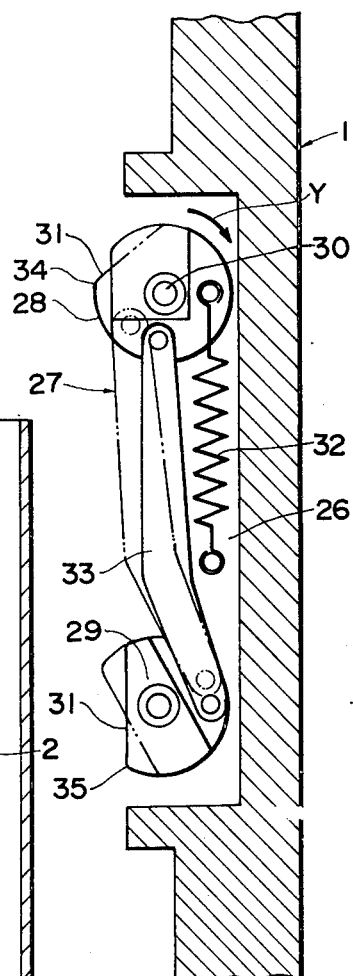

METHOD OF AND AN APPARATUS FOR MEASURING THE ELECTRODE LENGTH IN AN ELECTRIC FURNACE

This invention relates to a method of and an apparatus for measuring the electrode length in an electric furnace for producing ferroalloy, carbide and the like. Throughout the specification, by the term "electrode length" is meant the length of a portion of the electrode extending below an electrode holder.

The electric furnace to which the invention appertains is of the submerged-arc-type using an electrode penetrating the layer of material directly charged, and which is broadly used for the manufacture of ferroalloy, carbide and the like. Practically all electric furnaces of this type use consumable electrodes, and the operation of continuously lowering the electrode as it is being consumed and also the operation of joining a new electrode to the top of the working electrode are carried out while the operation of the furnace is continued.

While the electrode length has very important influence in the steady and stable operation of the electric furnace, it cannot be confirmed at once because the electrode extends through the layer of the material being processed.

Heretofore, it has been in practice to measure the electrode length by tentatively raising the electrode and directly measuring the length by means of a suitable tool formed by appropriately bending an iron bar or by inserting an iron rod into the material layer from the top thereof down to the lower end of the electrode burried in the material. However, these methods of measurement of the electrode length are very inconvenient. In the case of the former method, the operation of the furnace is interrupted every time the measurement is made because the electrode has to be tentatively raised for the measurement. Also, either method is carried out under the high temperature environment of the electric furnace, so that the operator is prone to hazards, while the precision of the measurement is very low. Particularly, the recent trend for the electric furnace to increase in size and be gas-tight in construction is augmenting the difficulties in the measurement of the electrode length, and this is very serious from the standpoint of the steady and safe operation of the electric furnace.

An object of the invention, accordingly, is to provide a method of and an apparatus for measurement of the electrode length, which permit quick, reliable and safe measurement of the electrode length without interrupting the operation of the electric furnace. To this end, according to the invention use is made of a hollow electrode, and an electric circuit for measuring the electrode length is formed with a lead wire extending through the hollow electrode, the molten material such as molten slag within the furnace and a power supply.

Where the hollow electrode is used, considerable furnace gas is usually dissipated out of the top of the electrode during the operation of the furnace. In accordance with the invention, a gas-tight unit is fitted in an upper portion of the hollow electrode and hermetically sealed therewith by means of packings to thereby prevent the dissipation of the furnace gas through the hollow electrode to the outside during the operation of the furnace, thereby permitting safe and simple operation of the joining electrodes and measurement of the electrode length or charging of the material at desired instants in the operation of the electric furnace.

The above and further objects and novel features of the invention will become more apparent from the following detailed description when the same is read with reference to the accompanying drawings, which are given for the purpose of illustration only and are by no means intended as limits of the scope of the invention, and in which:

FIG. 4 is a view similar to FIG. 3 but showing a second embodiment of the apparatus for carrying out the method according to the invention; and FIG. 5 is a fragmentary enlarged-scale sectional view showing part of the second embodiment of FIG. 4.

Figure 1:
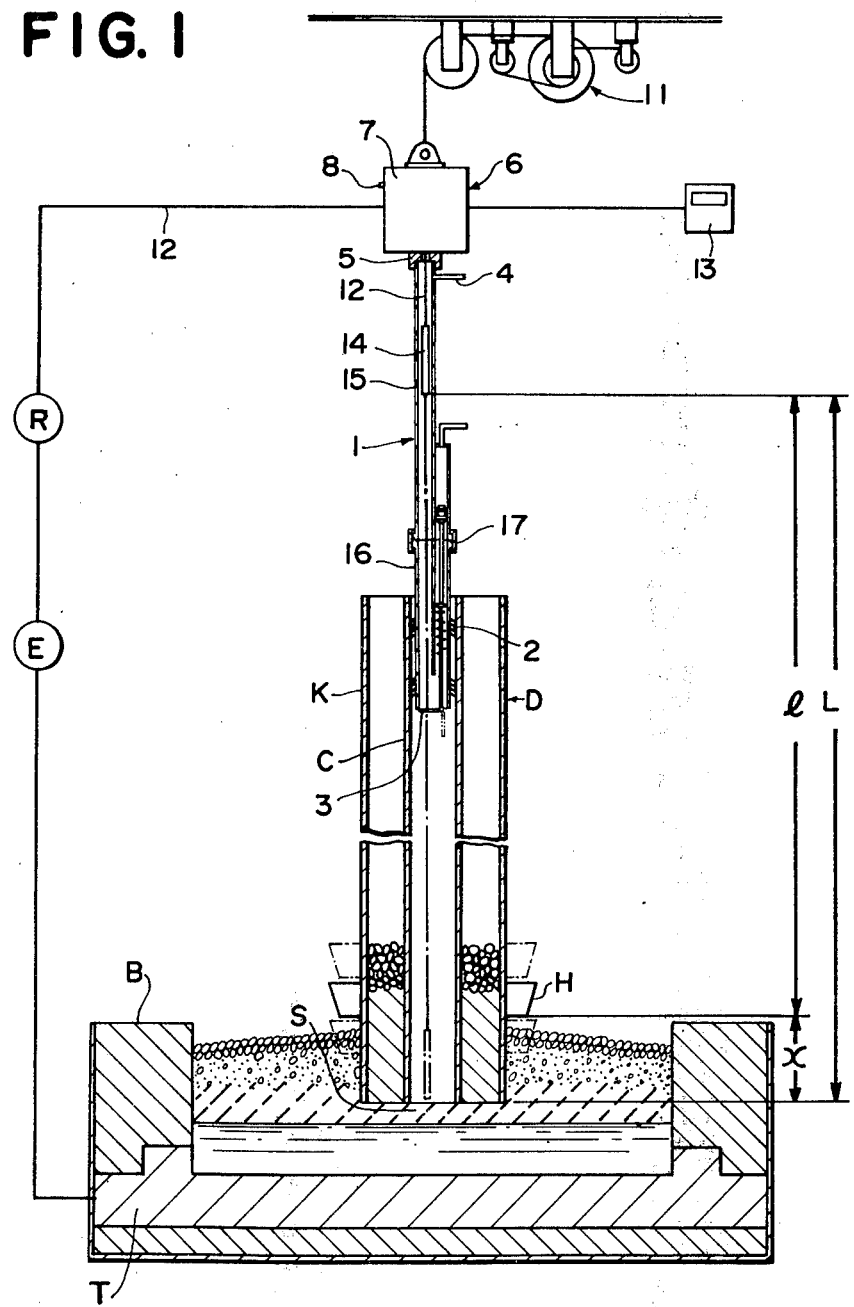
FIG. 1 is a schematic representation of a first embodiment of the apparatus for carrying out the method according to the invention.

Referring now to FIG. 1, which shows an embodiment of the apparatus for carrying out the method of measuring the electrode length according to the invention, designated at (D) is a hollow electrode consisting of a casing (K) and an inner hollow cylinder (C) and held at its lower portion by a holder (H).

A hollow cylindrical gas-tight unit 1 is fitted in an upper portion of the hollow cylinder of the hollow electrode (D) and sealed to the hollow cylinder by packings 2 surrounding it. An upper portion of the gas-tight unit 1 projects from the top of the hollow electrode (D).

The gas-tight unit 1 is provided at its lower end with a valve body 3, which can be on-off operated through a valve operating mechanism provided within the unit 1. The unit 1 is also provided in its wall portion near its upper end with a gas inlet duct 4.

The upper end of the gas-tight unit 1 is coupled via a seal joint member 5 to a gas-tight box 7 constituting a lead wire take-up means 6. The unit 1 and box 7 communicate with each other and are sealed to each other.

Figure 2:
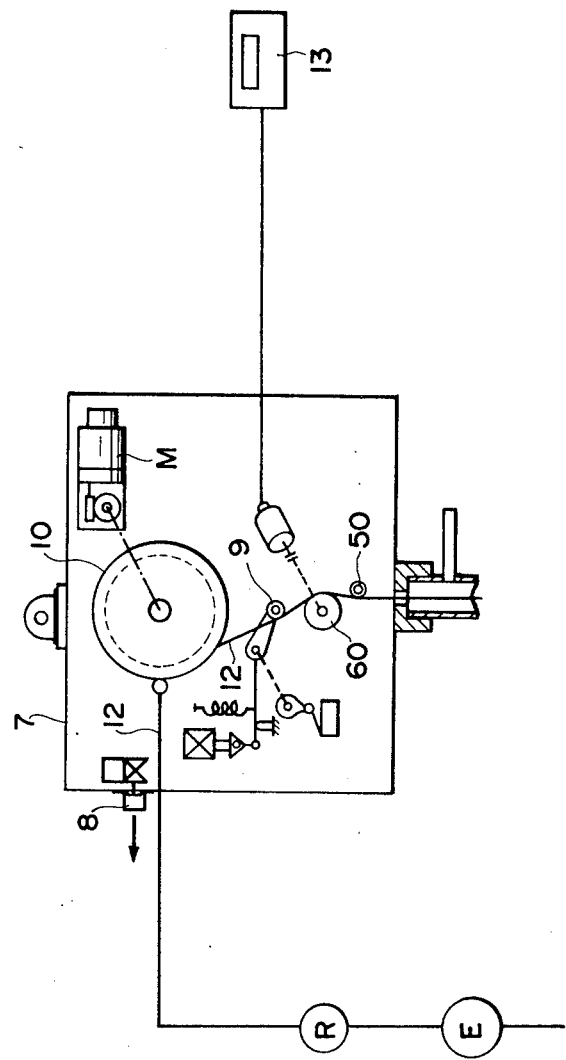
FIG. 2 shows a lead wire take-up means constituting part of the same apparatus.

FIG. 2 shows the lead wire take-up means 6. It comprises the gas-tight box 7 provided with a gas exhaust port 8 which can be opened and closed chiefly through valve operation, a tensioning roller 9 disposed within the gas-tight box 7, a take-up roller 10 driven from a drive source (M), guide roller 50 to guide an end portion of the lead wire depending from the take-up roller such that it depends vertically into the gas-tight unit and measuring roller 60 disposed between the tensioning roller 9 and the guide roller 50. A measuring unit 13 operating according to the rotation of the measuring roller 60 which is rotated according to the rotation of the take-up roller 10 is connected to the take-up means.

In the operation of the furnace the electrode (D) is subject to slight vertical movement as indicated by broken lines in FIG. 1 in dependence upon the molding property of the material. The gas-tight box 7 is suspended by a suspending mechanism 11 which permits the vertical movement of the electrode (D).

A conductive lead wire 12 is wound on the take-up roller 10. One end portion of the lead wire 12 is passed round the tensioning roller 9 and guide roller 50 and depends therefrom into the gas-tight unit 1, and it is provided at its end with a touch piece 14. The lead wire 12 is provided with an insulation covering, and the touch piece 14 consists of a high heat-resistant conductor and is provided with a heat-resistant insulating covering.

The other end portion of the lead wire 12 wound on the take-up roller 10 is connected through a relay (R) and a power supply (E) to a terminal (T) constituting the inner surface of the electric furnace (B). The aforementioned other end portion of the lead wire 12 may be connected to the bottom of the furnace in case if the furnace bottom is constituted by a carbon bed.

With the above construction, an electric circuit is formed by the lead wire 12, material (S) within the furnace, relay (R) and power supply (E). When the touch piece 14 is driven downwardly by the take-up roller 10 and brought into contact with the molten material (S) within the furnace, the electric circuit constituted by the lead wire 12, material (S) within the furnace, relay (R) and power supply (E) is closed. In an alternative form, the afore-mentioned other end portion of the lead wire may be connected to the casing of the electrode insofar as the electric circuit consisting of the lead wire, process material within the furnace, relay and power supply is closed when the touch piece 14 touches the process material. The relay (R) in the afore-mentioned electric circuit serves to detect caused through the circuit when the circuit is closed, thereby stopping the take-up means and indicating the length of descent of the lead wire to the measuring unit and also subsequently causing the take-up roller to raise the lead wire to a predetermined position.

The apparatus of the above construction is used for the measurement of the electrode length in accordance with the invention. The operation and effects obtainable with the method according to the invention will now be discussed.

Normally, the touch piece 14 provided at the end of the lead wire 12 wound on the take-up roller 10 is held suspended in a position within an upper portion of the gas-tight unit 1. At this time, the valve body 3 at the bottom of the gas-tight unit 1 is held in the closed state.

To measure the electrode length, inert gas such as nitrogen gas is previously fed into the gas-tight unit 1 through the gas inlet duct 4 to cause the gas that has occupied the interior of the gas-tight unit 1 to be exhausted through the gas exhaust port 8 provided in the gas-tight box 7. After the gas replacement in the gas-tight unit 1 in the above manner is completed, the gas exhaust port 8 is closed, while the feeding of the inert gas is continued to maintain the pressure inside the gas-tight unit 1 to be slightly higher than the outside pressure.

Next, the valve body 3 at the bottom of the gas-tight unit 1 is opened by operating the valve operating mechanism, while at the same time the drive source (M) is started to drive the take-up roller 10, thus lowering the touch piece 14 at the end of the lead wire 12. During this time the feeding of the inert gas into the gas-tight unit is continued. Since the gas exhaust port 8 is closed, the inert gas supplied is naturally introduced into the hollow cylinder (C). As a result, the pressure inside the hollow cylinder becomes slightly higher than the outside pressure, whereby it is possible to maintain the level of the process material beneath the lower end or tip of the hollow electrode (D) to be flush with the electrode tip.

When the touch piece 14 is lowered into contact with the process material, the electric circuit consisting of the lead wire 12, process material, relay (R) and power supply (E) is closed as mentioned earlier. Thereupon, current is caused through the electric circuit to actuate the relay (R), whereby the electrode length is indicated in the measuring unit. The electrode length is determined in the following way.

A distance (l) between the initial position, i.e., the starting position, of the touch piece 14 and the lower end of the electrode holder (H) is preliminarily measured. Then, by reading the length (L) of descent of the lead wire when the touch piece 14 is lowered into contact with the process material, that is, when the electric circuit is closed, as indicated by the measuring unit, the electrode length ($x$), defined as the length of the portion of the electrode extending below the electrode holder (H), can be known from $x = L - l$. In this case, slight vertical movement of the electrode as mentioned earlier has no effect upon the afore-mentioned equation because the electrode (D) moves in unison with the gas-tight unit 1, lead wire take-up means and touch piece.

After the electrode length is determined in the above way, the take-up roller is immediately driven in the reverse direction to take-up the lead wire 12 and raise the touch piece 14. Also, the valve 3 at the bottom of the gas-tight unit 1 is closed, while concurrently stopping the supply of the inert gas, thus ending the measuring operation. This measurement requires only several minutes, and during this time the furnace can be continuously operated without any interruption. Further, the electrode length can be measured quickly, accurately and safely.

Figure 3:
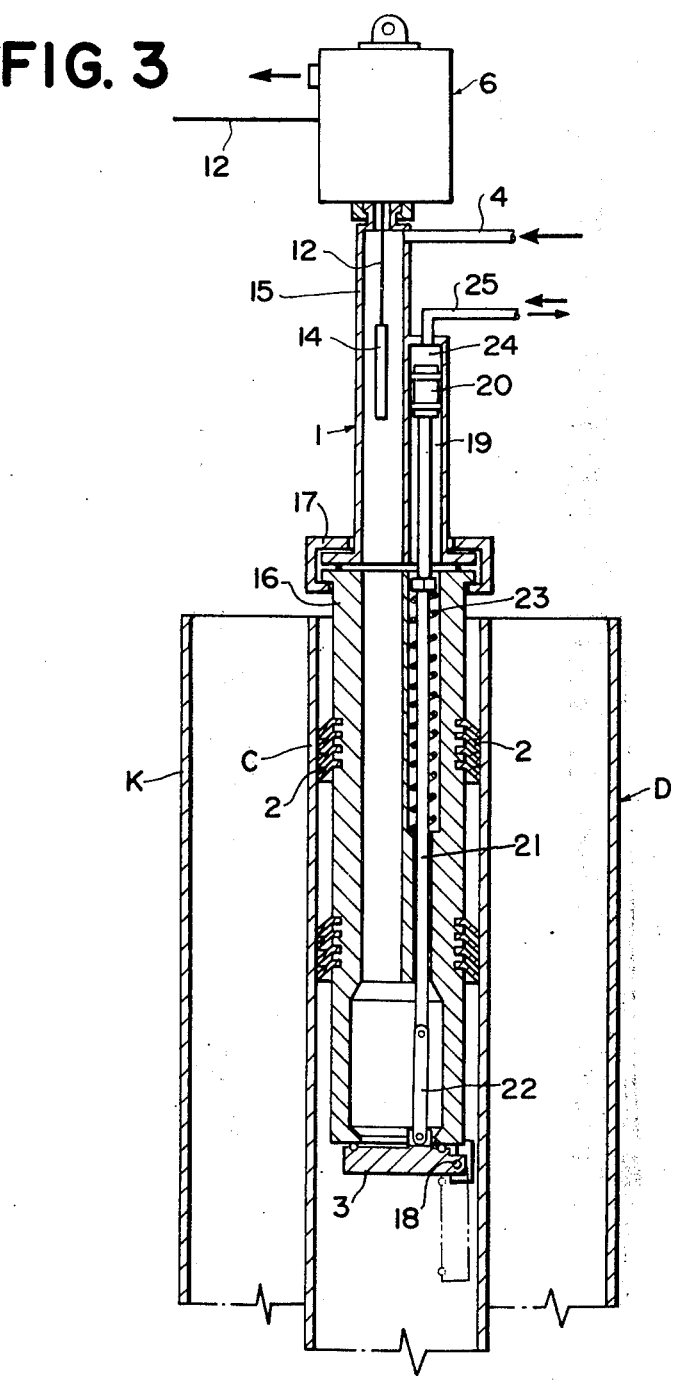
FIG. 3 is a sectional view, to an enlarged scale, showing part of the same apparatus.

The construction of the gas-tight unit 1 will now be described in detail with reference to FIG. 3, which is an enlarged-scale sectional view of part of the apparatus of FIG. 1.

The gas-tight unit 1 which is fitted in the hollow cylinder of the hollow electrode (D) is separable at a position slightly above the upper end of the electrode into upper and lower sections 15 and 16. Normally, both the sections are made imtegral with each other by a joint member 17. As mentioned earlier, the gas-tight unit 1 is supportedly sealed to the hollow cylinder of the hollow electrode (D) by means of the annular packings 2 surrounding it. The annular packings 2 permit upward movement of the gas-tight unit 1 relative to the hollow cylinder but act to check the downward movement.

The valve body 3, which is provided at the bottom of the gas-tight unit 1 and functions to seal the interior thereof, is pivotable about a support pin 18.

Meanwhile, the gas-tight unit 1 has a cylindrical guide path 19 extending parallel with its main interior space, and a valve operating mechanism is provided within the guide path. The valve operating mechanism comprises a piston rod 20 disposed within the guide path 19, a valve operating rod 21 extending downwardly from the piston rod 20, and a crank member 22 coupled to the lower end of the valve operating rod. 21. The valve body 3 is pivoted to the lower end of the crank member 22 such that it is rotatable with the vertical movement of the crank member.

The valve operating rod 21 is upwardly spring biased by a steel spring 23, so that the interior of the gas-tight unit is normally closed by the valve body 3. The steel spring upwardly biasing the valve operating rod may, if necessary, be replaced with a pneumatic spring.

The space in the guide path 19 above the piston rod 20 is made a pressurized gas chamber 24, and the top of the guide path 19 is provided with a gas inlet 25 communicating with the pressurized gas chamber 24.

With the above construction of the valve operating mechanism, by introducing pressurized gas into the pressurized gas chamber 24 through the gas inlet 25 the piston rod 20 is forced downward against the force of the spring 23, thus opening the valve body 3 through the valve operating rod 21 and crank member 22. To close the valve body 3 from its open state the above operation is reversed. More particularly, by exhausting the pressurized gas from the pressurized gas chamber 24 through the gas inlet 25 the valve operating rod 21 is raised by the force of the spring 24, thus closing the valve body.

Since the gas-tight unit 1 is sealed to an upper portion of the hollow cylinder of the hollow electrode via the annular packings 2, the furnace gas can be completely sealed against leakage through the gap between the hollow cylinder and gas-tight unit 1, thus permitting the joining of electrodes to be carried out safely. Also, since the gas-tight unit 1 is separable into the upper and lower sections 15 and 16, at the time of joining electrodes it is possible to separate the upper section 15 from the lower section 16 by removing the joint member 17, joining the casing and hollow cylinder of a new electrode to those of the old one and subsequently raising the lower section 16 fitted in the hollow cylinder of the new electrode to a predetermined portion and coupling it to the upper section. In this way, the operation of joining electrodes can be simply carried out without possible leakage of furnace gas or other hazards.

FIG. 4 shows a different embodiment of the apparatus for carrying out the method according to the invention. This embodiment is different from the preceding embodiment only in that some of the annular packings are replaced by securing means.

Referring to the Figure, gas-tight unit 1 has its outer peripheral wall formed with a plurality of radially spaced axial notches or grooves 26 extending substantially parallel to its axis. Each notch 26 accommodates a securing means 27 mounted in it.

The securing means 27 comprises disc-like upper and lower cams 28 and 29 each having a peripheral notch 31 which is adapted to face outer side. Each of the upper and lower cams 28 and 29 is rotatably mounted on a pin 30 secured to the opposite side walls of the notch 26. The upper cam 28 is biased at its side opposite the peripheral notch 31 with a spring 32 which is secured at the opposite end in the substantial central portion of the notch 26. The upper cam 28 is thus biased by the tension of the spring 32 in the direction of arrow (Y) in FIG. 4, that is, in the direction to upwardly turn the peripheral notch 31.

The upper and lower cams 28 are linked together via a link 33, which is linked at one end to a portion of the upper cam 28 below the support pin 30 thereof and at the other end to a portion of the lower cam 29 on the side nearer the gas-tight unit 1. By virtue of the link 33 with the rotation of the upper cam 28 the lower cam 29 is rotated in the direction opposite to the rotation of the cam 28. Below the securing means 27 annular packings similar to those in the previous embodiment are provided.

The function and effects of the securing means will now be discussed. To fit the gas-tight unit 1 having the securing means 27 in the hollow cylinder of the hollow electrode, it is fitted in the hollow cylinder (C) of the new electrode before the new electrode is joined. It is gradually inserted into the hollow cylinder (C) from its lower end by seeing to it that the notches 31 of the upper cams 28 in the securing means 27 are rendered substantially parallel to the axis of the gas-tight unit 1. When the gas-tight unit 1 is inserted into the hollow cylinder (C), each upper cam 28 is rotated by the tension of the associated spring 32 in the direction of arrow (Y) until the lower corner 34 of its notch is brought into contact with the inner surface of the hollow cylinder (C). Thus, the gas-tight unit 1 is supported in the hollow cylinder (C) by virtue of the radially outwardly projecting tendency of the lower corners of the upper cam notches. With the rotation of the upper cams 28 the lower cams 29 are slightly rotated. Since the upper corners 35 of the notches of the lower cams 29 must not touch the inner wall of the hollow cylinder (C) for the upward movement of the gas-tight unit 1, it is necessary to make the notches 31 of the lower cams 29 to be slightly greater than the notches 31 of the upper cams 28 or, alternatively, slightly shift the support pins 30 of the lower cams 29 toward the notch side.

The lower corners 34 of the notches of the upper cams 28 have the tendency of projecting radially outwardly of the gas-tight unit 1 very forcibly because this tendency is provided by the tension of the springs 32 plus the weight of the gas-tight unit. Thus, the gas-tight unit 1 is very strongly secured to the inner wall of the hollow cylinder (C). In fact, the gas-tight unit 1 supported in this state in the hollow cylinder (C) will not be downwardly moved even if it is downwardly pushed.

On the other hand, the raising of the gas-tight unit 1 through the hollow cylinder (C) can be readily achieved because at this time the securing force due to the outwardly projecting tendency of the upper cams 28 is released. Thus, when joining a new electrode, its casing and hollow cylinder are joined to the top of the respective casing (K) and hollow cylinder (C) of the old electrode, and then the unit 1 is gradually raised through the hollow cylinder (C) until the top of the unit is slightly projected from the hollow cylinder of the overall electrode.

As has been shown, by virtue of the securing means provided on the outer wall of the gas-tight unit 1, the gas-tight unit can firmly secured to the hollow cylinder of the hollow electrode and will never fall down. Also, variations of the furnace gas pressure in the normal operation of the furnace has no effect upon the securement.

In the manufacture of carbide and alloyed steel, abnormal rise of the gas pressure in the electric furnace is prone in the reaction process. In such case, the gas-tight unit 1 is raised by the increased furnace gas pressure. At this time, as soon as the upper cams 28 of the secureing means get out of the upper end of the hollow cylinder (C), the lower corners of the notches of the upper cams 28 having previously been in contact with the inner wall of the hollow cylinder (C) are rotated in the direction of arrow (Y) by the springs 32, causing the rotation of the lower cams 29 linked to the upper cams 28. As a result, the upper corners of the notches of the lower cams 29 are brought into contact with the inner wall of the hollow cylinder (C). The radially outwardly projecting tendency of the lower cams 29 is opposite in direction to that of the upper cams 28 but has the same effect, that is, it has the effect of firmly securing the gas-tight unit 1 in position against the upward thrust due to the furnace gas pressure. Thus, when the furnace gas pressure is abnormally increased, the gas-tight 1 will never get out of the hollow cylinder of the hollow electrode.

When the furnace gas pressure settles down to the normal pressure, the upper cams 28 now projected above the top of the hollow cylinder (C) prevent the gas-tight unit from falling. In this state, the gas-tight unit can be readily inserted into the hollow cylinder of a new electrode by rendering the notches of the upper cams 28 parallel to its axis.

What we claim is:

1. An apparatus for measuring the electrode length in an electric furnace, comprising:
   a hollow electrode having a lower portion buried in a layer of
   a process material within the electric furnace;
   a lead wire having one end portion suspended outside and above said hollow electrode;
   lead wire take-up means for lowering and raising said one end portion of said lead wire through the interior of said hollow electrode, said lead wire take-up means comprising a gas-tight box provided with a gas exhaust duct, a take-up roller disposed within said gas-tight box and driven by a drive source to lower and raise the lead wire, a tensioning roller, a guide roller for guiding an end portion of the lead wire vertically into said hollow electrode, and a measuring roller disposed between the tensioning roller and the guide roller;
   an electric circuit including said lead wire, a power supply and the process material within the electric furnace, said electric circuit being energized when said one end portion of said lead wire comes into contact with said process material within said furnace;
   a hollow gas-tight unit having a cylindrical interior, the lower portion of said gas-tight unit being fitted in an upper portion of said hollow electrode and the upper end portion of said gas-tight unit being coupled with a lower portion of said gas-tight box in communication with the interior of said gas-tight box, said one end portion of said lead wire being passed through the interior of said gas-tight unit; and
   measuring means coupled with said wire take-up means for measuring the length of descent of said lead wire when said electric circuit is energized.

2. The apparatus for measuring the electrode length in an electric furnace according to claim 1, further comprising a valve body mounted on a peripheral wall of said unit by a hinge at said bottom portion for sealing said bottom portion of said gas-tight unit; and a valve opening-and-closing mechanism provided outside the interior of said gas-tight unit and coupled to said valve body.

3. The apparatus for measuring the electrode length in an electric furnace according to claim 2, wherein said gas-tight unit has a first hollow portion for passing said lead wire therethrough, and a second hollow portion parallel with the first hollow portion, said hollow portions communicating at the lower end portion of said gas-tight unit; and further comprising a valve opening-and-closing mechanism disposed in said second hollow portion, said valve opening-and-closing mechanism comprising a valve body opening-and-closing rod, spring means normally urging said rod in direction to close said valve body, a crank coupling said valve body to a lower end of said opening-and-closing rod, and means for moving said rod against the normal biasing force of said spring means to open said valve body.

4. The apparatus for measuring the electrode length in an electric furnace according to claim 3, wherein said valve operating mechanism further comprises a piston rod provided on top of said valve operating rod, said guide path being provided at the top thereof with a pressurized gas inlet, the space in said guide path above said piston rod constituting a pressurized gas chamber.

5. The apparatus for measuring the electrode length in an electric furnace according to claim 1, wherein said electric circuit includes a relay circuit functioning to stop the drive of said lead wire take-up means by detecting current caused in said electric circuit when said electric circuit is closed and subsequently drive said lead wire take-up means in the reverse direction after the calculation of the electrode length is ended.

6. The apparatus for measuring the electrode length in an electric furnace according to claim 1, wherein said lead wire is provided with an insulating covering.

7. The apparatus for measuring the electrode length in an electric furnace according to claim 1, wherein said one end of said lead wire is provided with a touch piece comprising a high temperature resisting conductor provided with a heat-resistant insulating covering.

8. The apparatus for measuring the electrode length in an electric furnace according to claim 1, wherein said electric circuit includes a terminal provided within the electric furnace, the other end portion of said lead wire being connected through said power supply to said terminal.

9. The apparatus for measuring the electrode length in an electric furnace according to claim 1, wherein the other end portion of said lead wire is connected through said power supply to said electrode.

10. The apparatus for measuring the electrode length in an electric furnace to claim 1, wherein said gas-tight unit is fitted in said hollow electrode via annular packing means functioning to permit the upward movement of the gas-tight unit but prevent the downward movement of the gas-tight unit through the hollow electrode.

11. The apparatus for measuring the electrode length in an electric furnace according to claim 1, wherein said gas-tight unit is provided at the top wall with an inert gas inlet.

12. The apparatus for measuring the electrode length in an electric furnace according to claim 1, wherein said gas-tight unit is separable into an upper section and a lower section, said upper and lower sections being coupled together by a joint member.

13. The apparatus for measuring the electrode length in an electric furnace according to claim 1, wherein said gas-tight unit is provided on the outer periphery thereof with securing means using cam mechanisms.

14. The apparatus for measuring the electrode length in an electric furnace according to claim 13, wherein each said securing means comprises upper and lower disc-like cams disposed in upper and lower portions of a notched groove formed in the outer wall of said gas-tight unit, said upper and lower cams being each formed with a peripheral notch facing outwardly of the gas-tight unit, said upper and lower cams being rotatably supported on respective support pins secured to the outer wall of said gas-tight unit, said upper cam being spring biased by a spring connected to its side opposite its peripheral notch, the other end of said spring being secured at a position near the substantial center of said notched groove, said upper and lower cams being lined together via a link linked at one end to a lower portion of said upper cam and at the other end to said lower cam on a portion thereof nearer the gas-tight unit, said upper cam being biased by the tension of said bias spring such that its notch tends to be turned upwards.

15. The apparatus for measuring the electrode length in an electric furnace according to claim 1, wherein said guide roller is connected to a measuring means operated with the rotation of said guide roller.

16. An apparatus for measuring the electrode length in an electric furnace, comprising:
   a hollow electrode having a lower portion buried in a layer of a process material within the electic furnace;
   a lead wire having one end portion suspended outside and above said hollow electrode;
   lead wire take-up means for lowering and raising said one end portion of said lead wire through the interior of said hollow electrode, said lead wire take-up means comprising a gas-tight box provided with a gas exhaust duct, a take-up roller disposed within said gas-tight box and driven by a drive source to lower and raise the lead wire, a tensioning roller, a guide roller for guiding an end portion of the lead wire vertically into said hollow electrode, and a measuring roller disposed between the tensioning roller and the guide roller;
   an electric circuit including said lead wire, a power supply and the process material within the electric furnace, said electric circuit being energized when said one end portion of said lead wire comes into contact with said process material within said furnace; and
   measuring means coupled with said lead wire take-up means for measuring the length of descent of said lead wire when said electric circuit is energized.

17. A method of measuring the electrode length in an electric furnace, comprising:
   burying a lower portion of a hollow electrode into a layer of molten material within the electric furnace;
   winding a lead wire round a take-up roller of a lead wire take-up means arranged outside and above said hollow electrode;
   suspending one end portion of said lead wire through the interior of a hollow gas-tight unit whose lower portion is snugly inserted in an upper portion of said hollow electrode and whose upper end portion is coupled with a lower portion of said lead wire take-up means;
   forming an electric circuit of said lead wire, said layer of molten material, a relay circuit and a power supply;
   feeding an inert gas into said gas-tight unit and discharging a gas in said gas-tight unit from a discharge port of said lead wire take-up means, to thereby carry out gas exchange;
   closing said discharge port after completion of the gas exchange, and still feeding said inert gas to said gas-tight unit to bring the interior of said gas-tight unit to a higher pressure than the exterior thereof and to make a lower end surface of said hollow electrode substantially flush with a level of the surrounding molten material;
   opening said bottom portion of said gas-tight unit, and lowering said one end portion of said lead wire into contact with said layer of molten material, to close said electric circuit; and
   detecting a current flowing upon closure of said electric circuit by means of said relay circuit and thereby stopping the lowering of said lead wire, and reversely driving said take-up roller after completion of calculation of the electrode length to wind up said lead wire to its original position.

* * * * *